# United States Patent [19]

Brumbelow et al.

[11] Patent Number: 6,119,104

[45] Date of Patent: Sep. 12, 2000

[54] COMPOSITE BANKING DESKTOP SYSTEM

[75] Inventors: Michael J. Brumbelow, Cuyahoga Falls; Anthony C. Ehret, Parma, both of Ohio; Simon Charles Gregory, Binfield Heath, United Kingdom; Jeffrey Hojnacki, Olmsted Falls, Ohio; Douglas S. Meil, Cleveland Heights, Ohio; Martin R. Polak, Bay Village, Ohio; Timothy Michael Varley, Cleveland, Ohio; Catherine Elizabeth Williams, Boars Hill, United Kingdom

[73] Assignee: KeyCorp, Cleveland, Ohio

[21] Appl. No.: 08/977,075

[22] Filed: Nov. 24, 1997

[51] Int. Cl.[7] ........................................... G06F 17/60
[52] U.S. Cl. .................... 705/35; 705/42; 186/37
[58] Field of Search ................... 705/35, 38, 42, 705/43, 36, 27; 186/37; 235/379; 379/93.12; 345/326

[56] References Cited

U.S. PATENT DOCUMENTS

| 4,277,837 | 7/1981 | Stuckert | 235/380 |
|---|---|---|---|
| 4,799,156 | 1/1989 | Shavit et al. | 705/42 |
| 5,025,373 | 6/1991 | Keyser, Jr. et al. | 705/42 |
| 5,220,501 | 6/1993 | Lawlor et al. | 705/43 |
| 5,231,571 | 7/1993 | D'Agostino | 705/36 |
| 5,262,942 | 11/1993 | Earle | 705/37 |
| 5,600,114 | 2/1997 | Dunlap et al. | 235/379 |
| 5,604,896 | 2/1997 | Duxbury et al. | 395/500 |
| 5,606,496 | 2/1997 | D'Agostino | 705/38 |
| 5,611,052 | 3/1997 | Dykstra et al. | 705/38 |
| 5,649,116 | 7/1997 | McCoy et al. | 705/38 |
| 5,682,482 | 10/1997 | Burt et al. | 705/42 |
| 5,706,442 | 1/1998 | Anderson et al. | 705/27 |
| 5,710,889 | 1/1998 | Clark et al. | 705/35 |
| 5,715,298 | 2/1998 | Rogers | 705/40 |
| 5,774,663 | 6/1998 | Randle et al. | 709/204 |
| 5,787,403 | 7/1998 | Randle | 705/43 |
| 5,864,843 | 1/1999 | Carino, Jr. et al. | 705/35 |
| 5,866,889 | 2/1999 | Weiss et al. | 235/379 |
| 5,903,881 | 5/1999 | Schrader et al. | 705/42 |
| 5,913,202 | 6/1999 | Motoyama | 705/35 |
| 5,914,713 | 6/1999 | Nario et al. | 345/326 |
| 5,930,764 | 7/1999 | Melchione et al. | 705/35 |
| 5,933,816 | 8/1999 | Zeanah et al. | 705/35 |
| 5,940,811 | 8/1999 | Norris | 705/35 |
| 6,003,019 | 12/1999 | Eaton et al. | 705/42 |
| 6,023,684 | 2/2000 | Pearson | 705/35 |

FOREIGN PATENT DOCUMENTS

WO 97/22941  6/1997  WIPO ............................ G06F 17/60

OTHER PUBLICATIONS

Premeriani et al, "An Object–Oriented Relational Database", Communications of the ACM, vol. 33, No. 11, pp. 99, Nov. 1990.

"Digital Equipment's New Software Framework", Financial Express, p. 5, Dialog File 16:PROMT, Feb. 22, 1994.

Primary Examiner—Emanuel Todd Voeltz
Assistant Examiner—John W. Hayes
Attorney, Agent, or Firm—Thompson Hine & Flory LLP

[57] ABSTRACT

A multi-desktop computer system for a bank or other financial institution includes a plurality of functional desktop routines, each desktop operating on an identical "platform" of object-oriented routines. This "platform" of common object-oriented routines for use by each of the desktops, substantially reduces the design requirements of the desktops in that they only have to be designed to conform to the command structures of the object-oriented routines, and they do not have to be designed to any specific mainframe message structure or protocol. All of the functional desktops may be compiled together, along with the "platform" of object-oriented routines, to form one integral program, where a particular desktop will be activated, depending upon its need. The system enables a user to move between desktops, depending upon the need to activate a particular desktop. The system includes a system database that allows the desktops to share information with one another, such as customer information. The system also includes the capability of locking the user out of particular desktops, if that particular user does not require access to that particular desktop.

10 Claims, 9 Drawing Sheets

FIG. 6

COMPOSITE BANKING DESKTOP SYSTEM

BACKGROUND

The present invention relates to computer systems, and more particularly, to personal computer systems which interface with legacy programs contained within a mainframe system.

Many companies today provide services and keep customer information in mainframe computer systems. In many instances, mainframe computer systems are faster at accessing and processing relatively large amounts of information in comparison to a network of personal computers. However, many mainframe systems have evolved over time to include various capabilities and presently are comprised of various legacy systems, each performing a specific function and having a discrete message structure and protocol for storing and retrieving information. For example, in the area of banking, there may exist a first legacy system for retaining account information, a second legacy system for retaining financial product information, a third legacy system for handling loans, and so on; each system having its own message structure and protocol for accessing and storing information. Such mainframe systems utilized an array of terminals which could be positioned at locations remote from the mainframe.

As is often the case, the mainframe systems do not share substantial information or resources. Therefore, for example, the legacy system responsible for handling loan collections may not have access to the legacy system responsible for handling customer investments. Therefore, a bank customer who is a couple days late for a payment on a car loan and who has also invested in a $100,000.00 CD through the bank, may receive a telephone call from a collections agent about the loan because the collections agent did not have access to the customer's investment information. Therefore, the bank may unnecessarily risk angering and losing a valuable customer. With access to all of a customer's information, a bank would be better able to serve and retain that customer.

With the advent of personal computers, it has become possible to provide access for a personal computer, or a personal computer network, to a mainframe through a modem. Such a personal computer or computer network carries software capable of activating the associated modem, calling a host computer at a predetermined number, and by communicating with that host computer, requesting and transmitting certain types of data, such as account information, or sending commands, such as those associated with the transfer of funds from one bank account to another.

Accordingly, there is a need for a system that enables a personal computer or computer network to interface with a wide variety of legacy systems in a variety of settings. For example, such a system preferably is sufficiently flexible to be used by a customer at a remote kiosk, at a branch office of the bank, or at a telemarketing location. There is also a need for a system that facilitates the sharing of information and resources between the legacy systems.

SUMMARY OF THE INVENTION

The present invention provides a multi-desktop computer system for a bank or other financial services institution comprising a plurality of functional desktops, each desktop operating on an identical "platform" of object-oriented routines. The plurality of functional desktops may include a kiosk marketing desktop, a collections desktop, a branch desktop, a call center desktop, a brokerage desktop, and the like.

The present invention is designed to be used with a bank's computer mainframe and an interface server to facilitate communications between the platform of common object-oriented routines and the mainframe. The computer mainframe has a plurality of discrete database and application programs, which preferably include a financial transaction system, a customer information database and a product information database. Each of the object-oriented routines is configured to generate a message to a discrete database or application program in the mainframe in response to user commands and requests from the functional desktops, and in a protocol appropriate for the particular database or application program.

This platform of common object-oriented routines for use by each of the desktops substantially reduces the design requirements of the desktops in that each desktop need only conform to the command structures of the object-oriented routines, and not to any specific mainframe protocol structure. All of the functional desktops may be compiled together, along with the platform of object-oriented routines, to form one integral program, where a particular desktop will be activated, depending upon its need. Alternatively, each desktop may be compiled separately along with the platform of common object-oriented routines and installed into its respective location. In a preferred embodiment, in which all of the desktops are compiled into one integral program, the system enables a user to move between desktops, depending upon the need to activate a particular desktop. Also, the system preferably has the capability of locking a user out of selected desktops, if that particular user does not require access to that particular desktop.

The plurality of object-oriented routines in the platform preferably includes a configuration object for identifying each of the desktops and for allocating necessary resources to the desktops upon identification, a security object for restricting and controlling access to selected portions of the associated mainframe, a products object for handling requests to a product information database, a customer object for handling requests and commands to a customer information database in the mainframe, and a quotes object for calculating requests for rate quotes.

The marketing kiosk desktop, so named because it is designed to be installed in a stand-alone kiosk at a branch bank or in a shopping mall, includes a graphical user interface which enables a customer to browse through various financial products from the product information database to access and calculate quotes based upon information entered into the marketing platform by the customer using the graphical user interface. Such quotes include retirement quotes based upon the customer's age, retirement age, current salary, annual savings, and rate of return. Other financial products provided by the marketing kiosk may include products related to various borrowing options and checking options that are provided by the bank.

The branch desktops include a teller desktop, a sales desktop, and a self-service desktop. The teller desktop includes graphical user interface adapted for use by a bank teller. The call center desktops include a telesales desktop and a teleservice desktop, each of which provides graphical user interface adapted for use by such telephone service or sales consultants. The collections desktop would include a graphical user interface specially adapted for use by a collections agent. The brokerage desktops can include a trading desktop and a fulfillment desktop.

The system facilitates the sharing of information between certain desktops by allowing these desktops to use the same object-oriented routines. For example, it would be advantageous for the teller desktops, the sales desktops, and the collections desktops all to use the customer object, thereby assuring that each desktop has all the customer information available to best serve the customer. Therefore, the system preferably includes an object-database, accessible by the objects, that allows the objects to compile and share information apart from the mainframe database and application programs.

Preferably the system of the present invention also includes a transaction monitor server operatively coupled between the platform and a plurality of mainframes, for logging transactions requested and performed by the platform.

Other object-oriented routines in the platform can include a campaigns object, which allows manipulation of outbound marketing campaigns; a customer object, which provides an interface to customer search and profile retrieval; a credit object, which exposes functionality to new credit product applications and credit checking functionality; a deposit object, which exposes functionality to new deposit product applications; a reports object, for writing report records for retrieval; a preference data object which provides an interface to business data and lists literal strings, and for code/description conversions; a workflow object, which provides business process flow management; a zip code look-up object, which includes zip code look-up functionality; and a promotions object, which supplies promotional information to a user.

Accordingly, it is an object of the present invention to provide a multi-desktop computer system for a bank or other financial services institution which comprises a plurality of functional desktops, a computer mainframe, a plurality of object-oriented routines that are accessible by each of the functional desktops for receiving and processing commands and requests from the functional desktops, and an interface server for providing an interface between the set of object-oriented routines and the computer mainframe. It is a further object to the present invention that the plurality of functional desktops includes the kiosk-based marketing desktop, a collections desktop, a branch desktop, and a telephone personnel desktop.

Other objects and advantages of the present invention will be apparent from the following description, the accompanying drawings, and the appended claims.

BRIEF DESCRIPTION OF THE DRAWINGS

FIGS. 3–7 are sample screens for a desktops of the system of FIG. 1;

DETAILED DESCRIPTION

Figure 1:
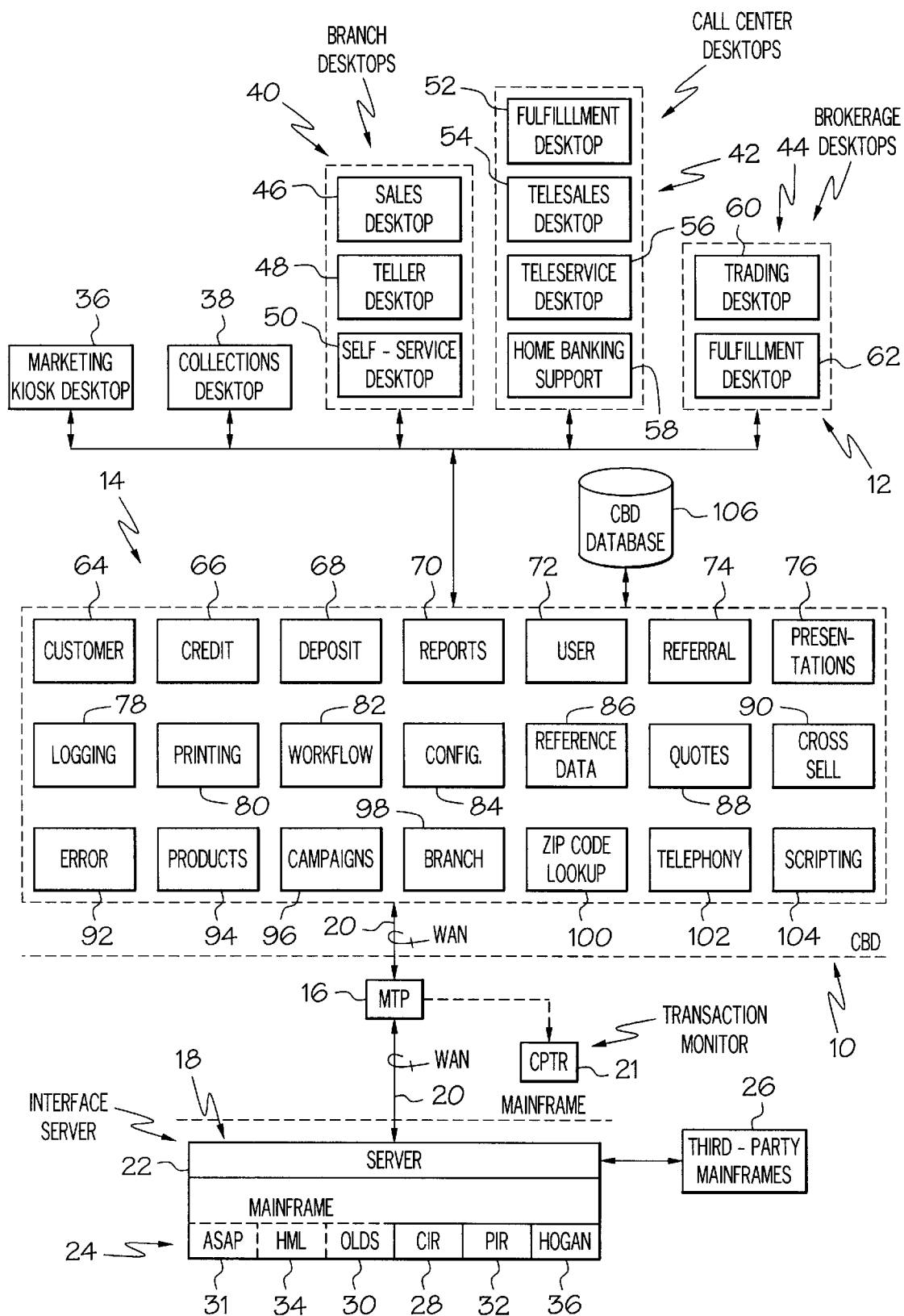
FIG. 1 is a schematic showing a preferred embodiment of the composite desktop system of the present invention configured to interface with a mainframe and perform banking functions.

As shown in FIG. 1, the composite banking desktop ("CBD") system 10 of the present invention includes a plurality of software routines, referred to as functional desktops 12, each of which operates on a platform 14 of object-oriented software routines. In the preferred embodiment, the plurality of functional desktops 12 and the platform 14 of object-oriented routines are compiled together to form an integral software package operating on a network of computers. The platform 14 includes a messaging transport protocol, such as TCP/IP or ECI, IBM's extended call interface product, generally designated MTP 16, which facilitates the actual communication for the CBD 10 into a mainframe computer 18 of the financial institution. The MTP 16 is preferably interconnected between the CBD 10 and the mainframe 18 by a set of data links 20 such as wide area networks. Additionally, the MTP 16 is linked to a transaction monitor server 21, which is responsible for logging transactions requested and performed by the CBD.

The mainframe computer 18 includes a mainframe interface server 22 for providing a communication interface between the mainframe legacy systems 24 and the MTP 16. The mainframe interface server 22 also provides a communication interface between the financial institution's mainframe 18 and third-party mainframes 26. The financial institution's mainframe includes corporate information repository database ("CIR") 28, which is a consolidated database of customer addresses, account data, relationship data, and the like; an on-line delivery system ("OLDS") 30 which is a primary database for storing information on all customer accounts; a credit system ("ASAP") 31; a product information repository ("PIR") 32, which is a data base containing information on the bank's products; a host maintenance link interface to an ATM network ("HML") 34 and a HOGAN 36 transaction posting system. The OLDS 30 provides automated teller and branch balancing and control functions such as deposit account transactions, credit account transactions, bill payment transactions, teller transactions, and the like. As mentioned above, the HML 34, OLDS 30, CIR 28, PIR 32, and HOGAN 36 mainframe systems are known collectively as legacy systems.

Preferably, the object-oriented routines receive commands from the functional desktops 12 and reconfigure the command data transmitted by the particular functional desktop into the proper message structure required by the particular legacy system that the command will eventually be sent. This reconfigured message is then sent to the MTP 16, which transmits the reconfigured message to the particular legacy system in the protocol required by that legacy system. Response messages sent back from the legacy systems are handled in a similar manner.

The plurality of the functional desktops 12 include a marketing kiosk desktop 36, a collections desktop 38, a plurality of branch desktops 40, a plurality of call center desktops 42, and a plurality of brokerage desktops 44. The collections desktop 38, the branch desktops 40, the call center desktops 42 and the brokerage desktops 44 are for use by agents of the financial institution when dealing with a customer or potential customer of the financial institution. Such interface between the agent and the customer, as will be appreciated by those skilled in the art, include face-to-face meetings, telephone conferences, computer communication over the modem, written correspondence and the like.

The branch desktops 40 include a sales desktop 46, a teller desktop 48, and a self-service desktop 50. The call center desktops include a fulfillment desktop 52, a telesales desktop 54, a teleservice desktop 56, and a home banking support desktop 58. Finally, the brokerage desktops 44 include a trading desktop 60 and fulfillment desktop 62. Each desktop is preferably a separate software module resident in the CBD system 10; and preferably is written in a software language specifically designed to create graphical user interfaces, such as Visual C++, Visual BASIC, or web-based tools such as JAVA (a trademark of Sun Microsystems, Inc.). Several of these desktops will be described in greater detail below.

The platform of object-oriented routines 14 is essentially a plurality of reusable, object-oriented routines, each of which is accessible by substantially all of the desktops. Each object-oriented routine is written in an object-oriented software architecture, such as Microsoft® OLE Standard Architecture. Essentially, each object-oriented routine 14 is configured to process a message or command from a desktop routine and format the message for the mainframe 18. The mainframe interface server 22, upon receiving the re-formatted message, compares the re-formatted message with a transaction table to determine which of the legacy systems 24 is to be linked with the re-formatted message.

The plurality of object-oriented routines 14 preferably includes a customer object 64, which provides an interface to customer search and profile retrieval; a credit object 66, which exposes functionality to new credit product applications and credit checking; a deposit object 68 which exposes functionality to new deposit product applications; a reports object 70, which facilitates the writing of report records for retrieval via a commercially available database system report writer; a user object 72, which contains authentication and access control functionality for the users of the CBD desktops 12; a referral object 74, which allows referrals to other departments within the bank; a presentations object 76, which handles sales presentations via audio, video, slide show, and the like; a logging object 78, which provides system-wide logging facilities; a printing object 80, which provides standard printing interfaces to commercially available publishing tools and also provides for document merging, queuing and printing; a workflow object 82, which provides business process flow management; a configuration object 84, which allows definitions of workstations/desktops as CBD desktops and allocates resources to the particular workstations running the CBD desktop thereon; a reference data object 86, which provides an interface to business data and lists, literal strings, and code/description conversions; a quotes object 88, which provides a quotes and calculation engine; a cross-sell object 90, which, given available customer data, will suggest to a sales representative possible cross-sell products; an error object 92, which provides system-wide errors stacked in display functions; a products object 94, which facilitates access to the PIR database 32 in the mainframe 18 and returns product rates and fee information upon request; a campaigns object 96, which allows manipulation of outbound campaigns; a branch object 98, which allows branch search and details look-up; a zip code look-up object 100, which provides zip code look-up functionality; a telephony object 102, which provides an interface to telephone disposition systems and inter-site voice/data transfer; and a scripting object 104, which provides the ability to control a user's navigation in a particular desktop using a prerecorded script. Several of the above objects 14 access and write to a CBD database 106. As will be described in further detail below, the CBD database allows the objects 14 to store and share information without necessitating access to any legacy systems.

Figure 2:
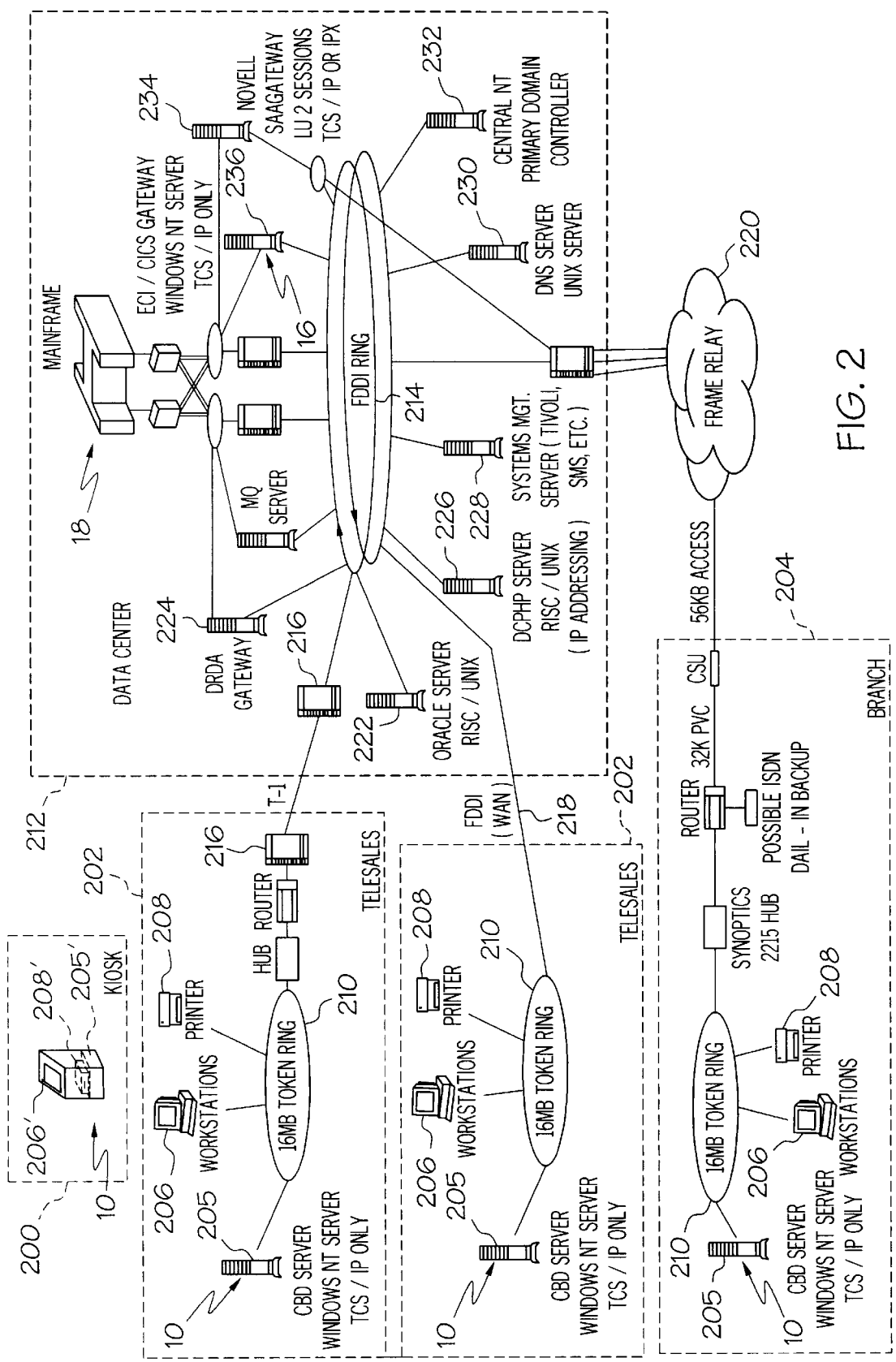
FIG. 2 is a schematic of the system of FIG. 1 showing the interconnection of several desktops.

As shown in FIG. 2, a plurality of CBD systems 10 may be linked to operate separate physical locations. For example, a marketing kiosk 200 includes a CBD system, two telesales locations 202 (in different physical locations) each includes a CBD system, and a plurality of bank branches 204 (in different physical locations) each include a CBD system. Preferably, each CBD system 10 is resident on a network server 205, such as a Windows NT Server, such that a plurality of network terminals 206 and printers 208, each having access to the CBD system, can be interconnected to the CBD system via a token ring network 210. In the case of the marketing kiosk 200, a network server is not necessary, and therefore may include a stand-alone computer/server 205', a single terminal 206' and printer 208'.

At a central location, a data center 212 comprises a plurality of servers interconnected on an FDDI LAN structure 214, which enables communication to and from the mainframe 18. Each location can be connected to the data center 212 by a pair of hubs 216, by direct coupling 218 to the FDDI LAN structure, or through a frame relay communications system 220 provided that can be provided by an independent third party provider. Although not indicated in FIG. 2, the marketing kiosk 200 may be connected to the data center 212 by any of these connections. A legacy gateway server 234 provides access to the mainframe legacy systems from the FDDI ring and the ECI server 236 maintains the MTP object 16 as described above. The plurality of servers may further include a database server 222 which may support the CBD database 106 (see FIG. 1), and a gateway server 224 may be provided to facilitate the transfer of data between the mainframe 18 and the database server 222. An IP addressing server 226, a systems management/maintenance server 228, a machine name to IP translation server 230, IP logon control server 232, and a credit application/processing server (not shown) may also be provided in the data center 212.

Desktops

Several of the desktops 12 for use with the present invention will be described as follows. As will be apparent to one of ordinary skill in the art, the following descriptions are for illustrative purposes and any desktop for use with a multi-desktop bank computer system as described above will fall within the scope of the present invention.

Figure 3:
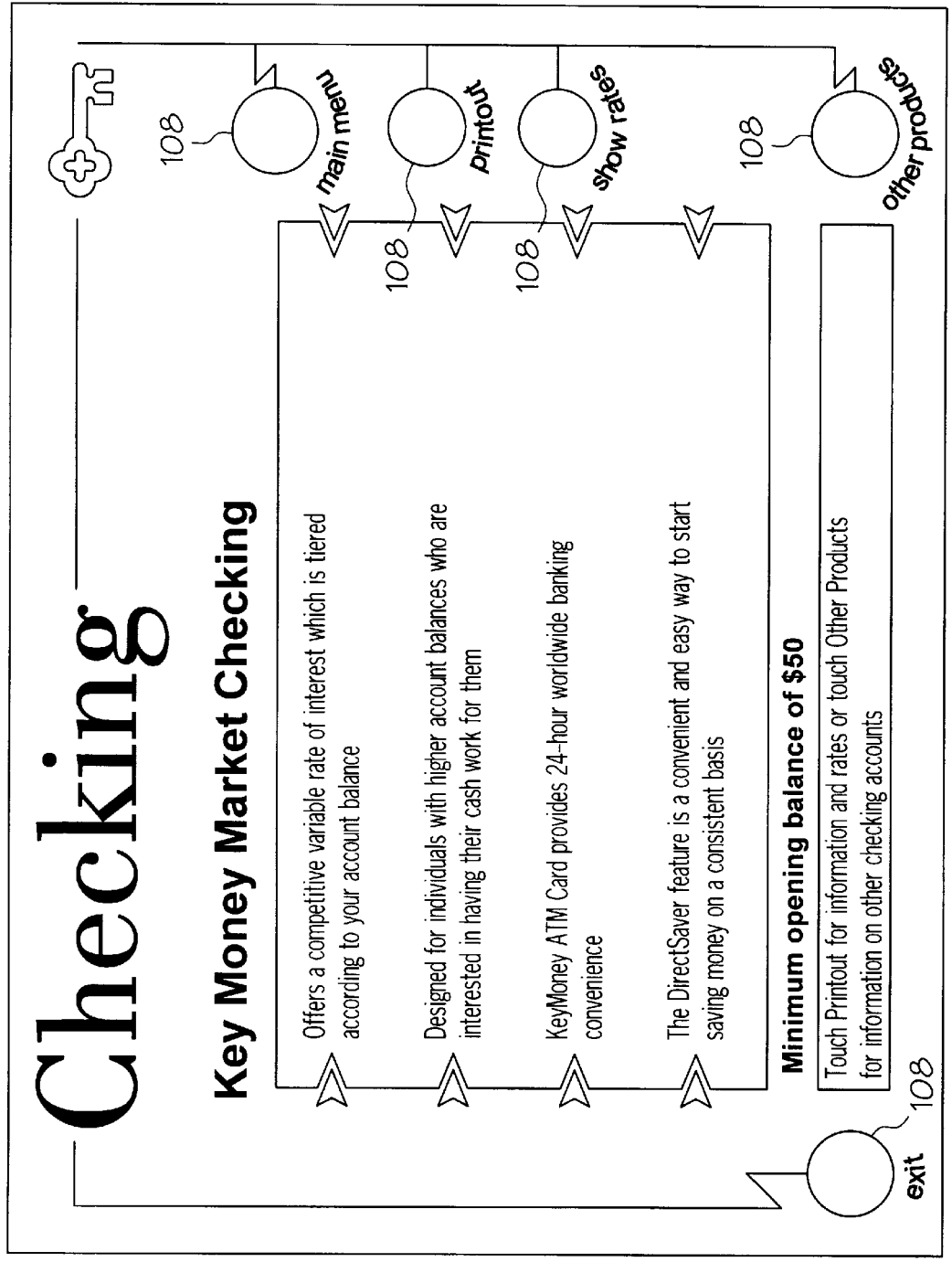
Figure 4:
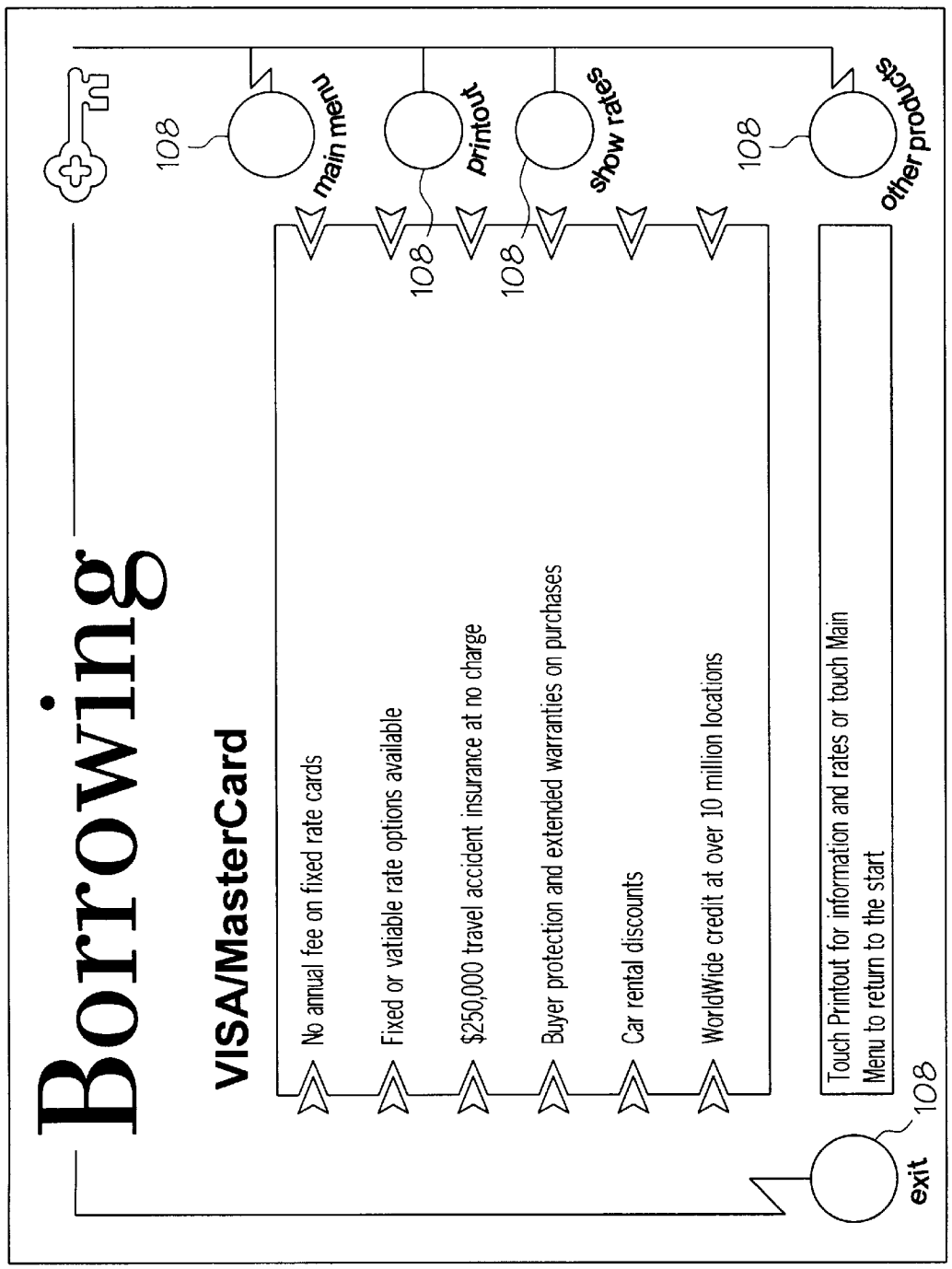
Figure 5:
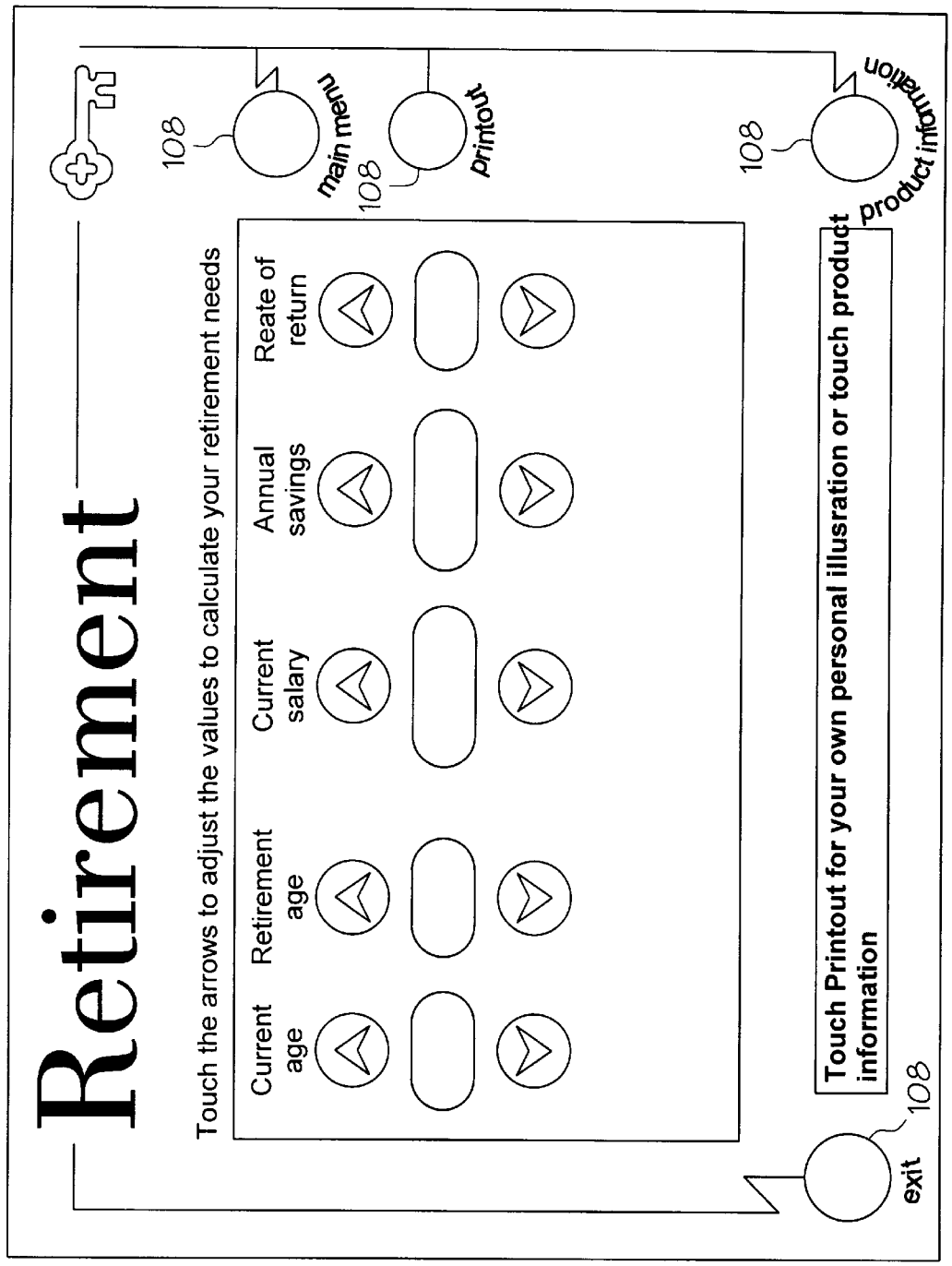

The marketing or kiosk desktop 36 is the primary desktop routine operating at the kiosk 200. Examples of certain screens which may form part of the kiosk desktop are shown in FIGS. 3–5. The kiosk desktop 36 includes a graphical user interface for allowing a bank customer to browse through various products of the bank and for allowing the customer to access and calculate quotes based upon information entered by the user operating the graphical user interface. FIG. 3 shows a typical graphical user interface screen which provides marketing information pertaining to the bank's checking account services. The graphical user interface is preferably a touch-screen type interface having various virtual buttons 108 that a user can activate by touching the screen at those locations. Once activated, the interface will perform a particular function, such as activating a printing screen, displaying a rate screen, a main menu screen, or another products screen. As shown in FIG. 4, another typical screen for the marketing kiosk desktop 36 provides marketing information pertaining to the bank's lending products; and as shown in FIG. 5, another user interface screen for use with the marketing kiosk desktop 36 comprises a vertical "keypad" for calculating a customer's retirement needs and saving potential based upon that customer's current age, retirement age, current salary, annual savings and a rate of return. All of these variables may be input into the graphical user interface by activating certain areas of the touch-screen. Similar quoting or calculating screens, referred to as "what-if" screens, can include screens for education planning, savings planning, mortgage planning, and the like.

It is also within the scope of the invention that the marketing kiosk desktop 36 include an ability to present automated or video sales presentations to a user at an associated terminal. The marketing kiosks 204 for use with the present invention may be located within the banks themselves to provide potential or current customers of the banks with additional information pertaining to additional or optional services that the bank provides, and which does not require the customer to consult a bank sales representative. The marketing kiosks 204 can also be placed at remote locations to attract potential customers that are not presently customers of the particular bank.

Figure 6:
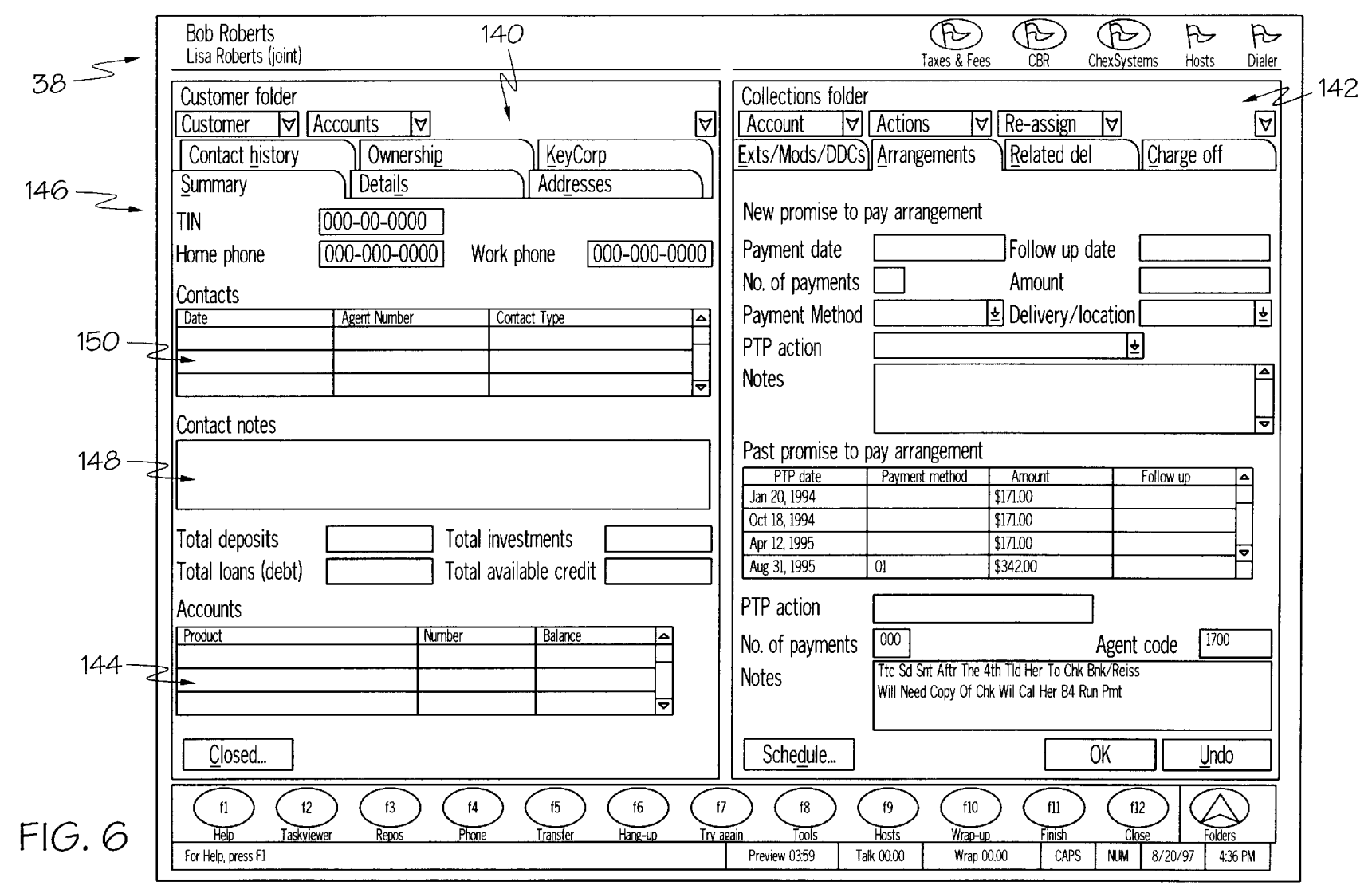

As shown in FIG. 6, the collections desktop 38 includes a graphical user interface to facilitate use of the desktop by a collections agent. Primarily, to provide an effective and valuable service to the customer, the collections agent needs to be able to review the overall relationship of the customer with the particular financial institution, access and manipulate account delinquency details, access the most recent contacts between the customer and the financial institution, and review associated customer correspondence and credit bureau reports. Accordingly, the collections desktop 38 is divided into two areas or folders: the customer folder 140 and the collections folder 142. The customer folder 140 provides customer information to the agent such as the different financial products presently used by the customer is presently taking advantage of (see the Accounts area 144), demographic details 146, miscellaneous information about the customer 148 (entered, for example, by other employees of the financial institution using other desktops), history of past contacts with the customer 150 (to avoid, for example, unnecessary or redundant contacts with the customer), and the like.

The customer folder 140 is preferably used in a similar manner by each desktop that provides a graphical user interface for an employee of the financial institution who deals directly with the customer. For example, the customer folder 140 is preferably used by the sales desktop 46, the teller desktop 48, the fulfillment desktop 52, the telesales desktop 54, the teleservice desktop 56, and the trading desktop 60. The customer object 64 is preferably accessed by these desktops to generate and maintain the customer folder 140 therewithin. Upon selection of a particular customer within a desktop, the customer object 64, in response to an update request, will access the CBD database 106 to update the customer folder 140 within that desktop. The customer object 64 may also access the customer information from the CIR database 28. The desktop has the ability to modify or add to the customer information in the customer folder 140, which will update the customer information appropriately in the CBD database 106 and/or CIR database.

The collections folder 142 provides the collections agent with the appropriate information and tools to access and manipulate account delinquency details, obtain a promise to pay from the customer, recommend actions to re-possess collateral, determine if multiple accounts are delinquent, and utilize telephony to position customer with correct service group or agent. Although not shown in FIG. 7, the collections desktop 38 also includes the ability to stack multiple customer folders 140 and multiple collection folders 142 upon one another. One advantage of such capability is that it will allow a collections agent to have access to customer information not only for the present customer, but for parties related to the present customer such as co-maker, joint maker and the like. Such capabilities will also allow a collections agent to access multiple accounts for the customer. Thus, if more than one account is delinquent, an agent may be able to arrange correction of the delinquency of all accounts in one customer contact session, avoiding unnecessary aggravation to the customer.

Figure 7:
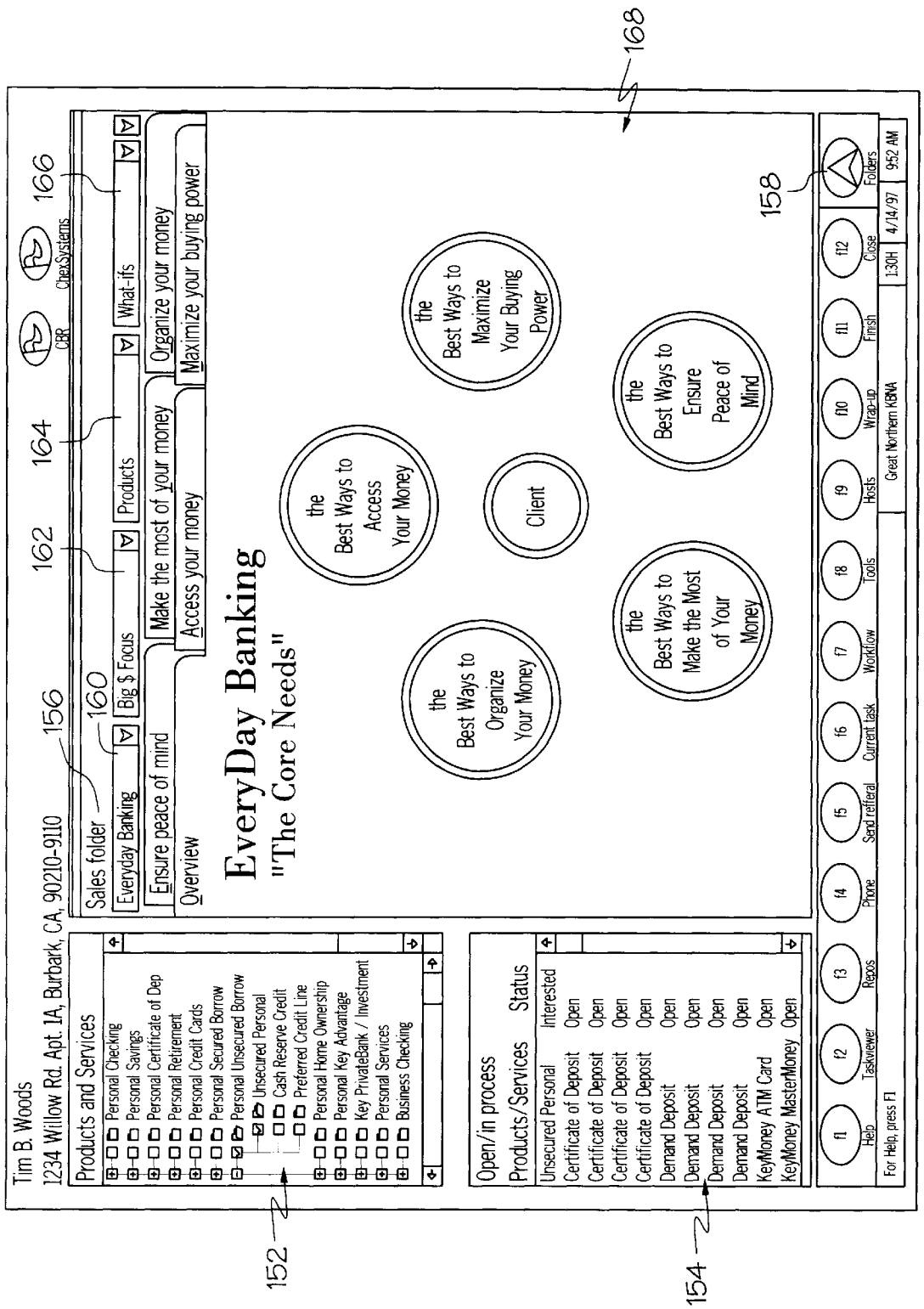

As shown in FIG. 7, the sales desktop 46 (or the telesales desktop 54) includes a graphical user interface to facilitate the use of that desktop by a sales consultant, agent or salesperson within the bank. Such a desktop is available both to the telesales locations 202 and the branch locations 204. The sales desktop 46 includes a products and services table 152 that displays all products and services offered by the financial institution. By activating an item in the products and services table 152, the sales consultant is able to access more information on a particular product or service and is able to indicate in a database that the particular client is interested in the product activated. Such information preferably is accessed from the CBD database 106 or the PIR legacy system 32 using the products object 94 (see FIG. 1). Also included on the sales desktop 46 is an open/in process table "shopping cart" 154 that lists for a sales consultant all of the products in which that a particular customer already has participated or shown an interest.

The sales desktop 46, similar to the collections desktop described above, includes a sales folder 156 and a customer folder (not shown). The customer folder is substantially identical to the customer folder 140 described above. However, it is not displayed side-by-side with the sales folder 156 so that the products and services table 152 and the open/in process table 154 can be displayed. In this screen, the customer folder can be accessed easily by activating the folder button 158.

The sales folder 156 includes four sub-folders, each of which can be accessed by activating corresponding virtual buttons: the "Everyday Banking" folder button 160, the "Big Five Focus" button 162, the "Products" button 164, and the "What-Ifs" button 166. In the screen shown in FIG. 7, the Everyday Banking sub-folder 168 is active and displayed. The Everyday Banking folder 168 guides a sales consultant and/or customer through a series of questions based upon a customer's needs or desires and then helps the consultant and/or customer to select the most suitable banking and service products available to the customer based upon the way the customer answered the questions.

The Big Five Focus sub-folder guides a customer or sales consultant through a series of questions which focus on one of five areas: education planning, retirement planning, debt payment, borrowing, and accumulation of wealth. Based upon how a customer answers the questions, the desktop recommends products best suited to the customer's needs. The Products folder will allow a customer or sales consultant to access details about the products available such as options, rates and fees, and the like. The Products sub-folder will also allow the customer to fill out a generic application which can be used to apply for any or all of the products available. This generic application will pull information from the customer folder, preferably from the CBD database 106, to fill in the information already available for the customer. The generic application screen will utilize the credit object 66, the deposit object 68 and the customer object 64 (shown in FIG. 1) Therefore, by sharing information between desktops, the application process is shorter and easier. Finally, the What-Ifs sub-folder provides the agent/customer with quoting or calculating screens, referred to as "what-if" screens, which include screens for retirement planning, education planning, savings planning, mortgage planning, and the like. These screens will be similar to, or the same as, the "what-if" screens used in the marketing kiosk desktop 36 described above.

At this point, it is apparent to one skilled in the art that unlimited varieties of styles for graphical user interfaces can be incorporated into each or all the desktops to perform the specific functions required by such desktops.

Reusable Object-Oriented Routines

Several of the object-oriented routines 14 for use with the present invention will be described as follows. As will be apparent to one skilled in the art, the following descriptions are for illustrative purposes and that any reusable object-oriented routine for use with a multi-desktop bank computer system as described above will fall within the scope of the present invention.

The primary role of the products object 94 within the CBD system 10 is to supply products, rates and fees information to the desktops 12 upon request. The rates and fees information is obtained from the PIR database 32 within the mainframe (see FIG. 1). These data are accessed from the PIR 32 and downloaded into the CBD database 106. The download of the data from the PIR database 32 to the CBD database 106 is a function of a separate program operating within the CBD, whose primary purpose is for such a download. The products object 94 will always assume that the data within the CBD database 106 is up-to-date and accurate. Thus, the products object 94 will not necessarily directly request refreshes of the CBD database.

Figure 8:
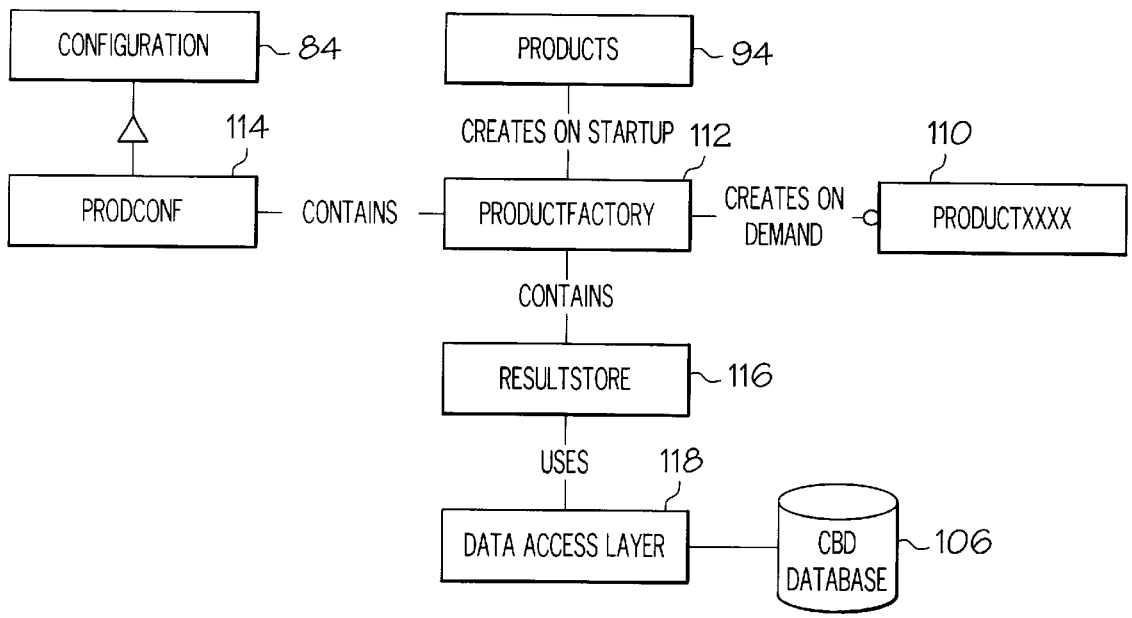
FIG. 8 is a schematic of a high level class hierarchy within the products objects of the system of FIG. 1.

FIG. 8 illustrates the high level class hierarchy within the product object 94. Upon startup, the product object 94 will create a complete set of productxxxx objects 110 internally. The productxxxx objects 110 are illustrated as "productxxxx," where "xxxx" contains the product identification. The product factory object 112, created upon start up of the products object 94, contains a product configuration object 114 and a result storer 116. The complete set of rates and fees are stored in the result storer 116, which keeps track of when it was last updated. The result storer 116 updates itself after a predetermined amount of time. The result storer 116 accesses the CBD database 106 through a data access layer 118. As described above, the configuration object 84 follows the definition of a work station operating a desktop as an entity within the CBD system.

Figure 9:
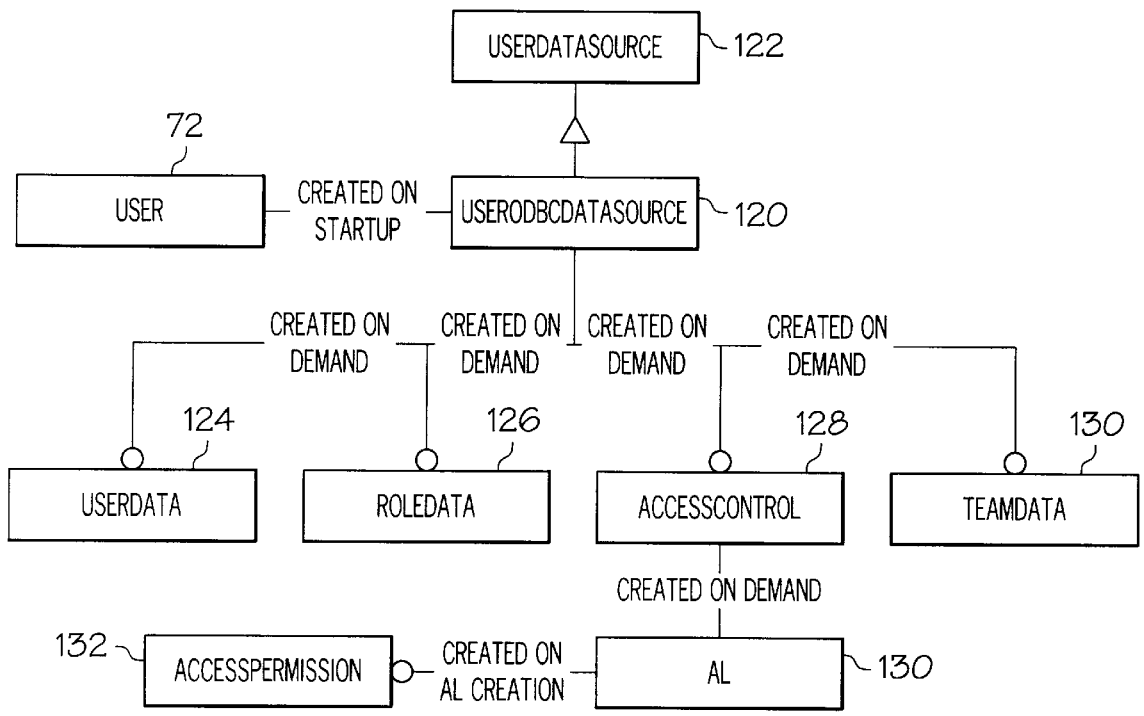
FIG. 9 is a schematic of a high level class hierarchy within the user objects of the system of FIG. 1.

The user object 74 has several purposes: to allow the definition of users with a role (i.e., a set of predefined responsibilities) to the CBD system; to provide a user authentication system allowing only previously defined users access to any system function; to segregate access to work flow tasks by a users role; to segregate the access to system function by role on a hierarchical basis down to the presentation field level (for example, sales agents may be able to talk to the sale presentation but not process the application form); and to provide the ability to group users other than by virtue of their associated role. FIG. 9 illustrates the high level class hierarchy within the user object 72. As shown in FIG. 9, upon startup of the user object 72, a data source access object 120 will be created which provides an interface to a data source 122. Upon demand, a user data object 124, a role data object 126, an access control object 128 or a team data object 130 can be created. Each of these objects has common functionality to retrieve, update, and delete their data from the data source 122. Each of these objects provides a view of the data according to its name. The access control object 128 accesses an access list 130 associated with a particular resource. Upon creation of the access list 130, an access permission object 132 is created which holds an individual resources ID/access pair.

The logging object 79 provides system-wide access to a standard method to log data for both system logging and audit purposes. A standard interface is provided that allows a potential user to register interests in using logging services, identifying the target data source for the logging, as well as details about standard items to be logged, such as user logon and work station logging on.

The error object 92 provides an implementation of an error stack. New errors are pushed into the stack, on top of any existing errors. Once pushed onto the stack, control is then returned to the user, and the "caller" can then decide whether and how to handle the errors. If the calling object cannot handle the errors, control is passed up its hierarchy until the appropriate object is reached that can handle the error. At this point, the user is informed any logging required his action, and the stack is cleared. An advantage of the above stack approach is that a record of all events and/or information through the architecture can be retained for detailed problem resolution even when the reporting of errors can limited to a higher level. Where required, all errors (or those passing a filter process) can be permanently logged. This will aid retrospective problem determination. The error object can also be used to process any other type of message and to provide an appropriate severity code.

As discussed above, the CBD system is configured especially to provide for switching between desktops at single work station. Therefore, it will possible for a user to be in the middle of a task on a first desktop when he is interrupted, and is then required to start or resume another desktop (a telephone call, for instance). If errors existed in the original desktop, they must be preserved until the user switches back to it. Therefore, it will be necessary to establish a number of error stacks (one per desktop), all owned by the desktop error stack.

The workflow object 82 facilitates the mapping of business processes performed into discrete tasks which are governed by a predefined set of rules. Tasks of work may be grouped into processes and, in turn, processes are grouped to build a hierarchy of workflow automation.

The credit object 66 facilitates the transmission of a completed credit card application (either a full application or an instant credit application) to the ASAP legacy system 31, accesses the ASAP preapproval VSAM file for customer preapproval status and data, and accesses the ASAP Legacy system 31 for special data validations (i.e., corporate code, product, package, P.O. box, region, branch, and the like).

Figure 10:
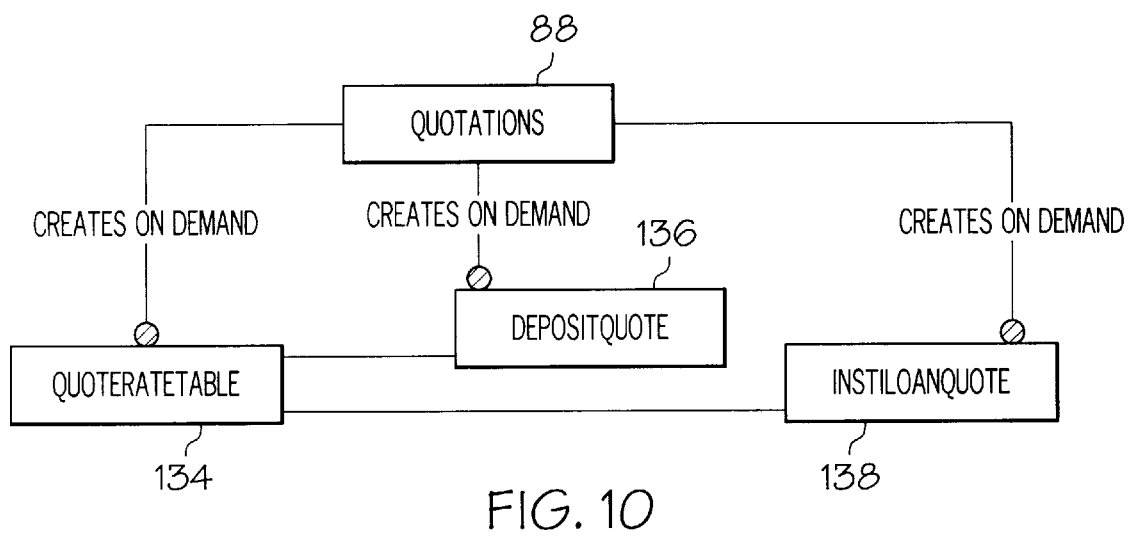
FIG. 10 is a schematic of a high level class hierarchy within the quotes object of the system of FIG. 1.

The quotes object 88 is responsible for undertaking financial calculations on behalf of a desktop. It can handle both credit and deposit type calculations and is completely independent of the products object 94. As shown in FIG. 10, the class hierarchy for the quotes object 88 includes a quote rate table object 134, a deposit quote object 136 and an installment loan quote object 138, all of which are created upon demand.

The deposit quote object 136 performs calculations involved with investment accounts, retirement and education planning accounts, and the like. The installment quote object performs operations that involve loan products. Quote rate table object 134 creates hold rate tier table entries. Only one rate table is allowable per quotation being performed and it must be associated with the quotation object 88 prior to the quote being run.

The referral object 74 is accessible by a desktop and will allow the user to input referrals, input the status of referrals and update a referral status. A referral occurs when a bank employee refers a non-customer (or existing customer) to a salesperson in a specialty line of business for follow-up on potential sale of a product. In the event of a sale, the referring employee gets compensated commensurate with the type of product sold. The referral object 74 provides an electronics referral a necessary database for tracking the life cycle of a referral.

In summary, the present invention provides a multi-desktop computer system for a bank or other financial institution comprising a plurality of functional desktops, each desktop operating on an identical platform of reusable, object-oriented routines. This platform of common object-oriented routines for use by each of the desktops substantially reduces the design requirements of the desktops in that they need only conform to the command structures of the object-oriented routines, and not to any specific mainframe message structure or protocol. All of the functional desktops may be compiled together, along with the platform of object-oriented routines, to form one integral program, where a particular desktop will be activated, depending upon its need. Furthermore, the CBD system enables a user to move between desktops, depending upon the need to activate a particular desktop; and the CBD system includes an internal database that allows the desktops to share and update information with one another. The system will also have the capability of locking a user out of particular desktops, if that particular user does not require access to that particular desktop.

Having described the invention in detail and by reference to the drawings, it will be apparent that modification and variations are possible without departing from the scope of the invention as defined in the following claims:

What is claimed is:

1. A multi-desktop computer system for a financial institution, comprising:

a plurality of functional desktops, including a branch desktop and a financial service agent desktop;

a computer mainframe having a plurality of discrete databases and application programs, including a financial transaction system, a customer information database, and a product information database;

a plurality of object-oriented routines, each of said routines being accessible by the functional desktops, for receiving and processing commands and requests from the functional desktops;

an interface server for providing an interface between the object-oriented routines and the discrete database and application programs; and a system database, accessible and modifiable by the functional desktops through at least one of the object-oriented routines, whereby the system database allows the functional desktops to share information with one another;

wherein the object-oriented routine is configured to generate a data request message to a particular discrete database or application program in response to a data update command or request from a functional desktop, and the object oriented routine is further configured to update the system database with data received from the particular discrete database or application program in response to the data update command.

2. The multi-desktop computer system of claim 1, wherein each of the object-oriented routines is configured to generate a message to a selected one of said databases or application programs, in response to the commands and requests from the functional desktops, in a message structure specific to said selected one of said databases or application programs.

3. The multi-desktop computer system of claim 2, wherein each of the discrete databases and application programs has its own specific protocol requirements, and the system further comprises a communication object-oriented routine adapted to satisfy the protocol requirements.

4. The multi-desktop computer system of claim 1, wherein the plurality of object-oriented routines includes:

a configuration object for identifying each of the desktops and for allocating necessary resources to the desktops upon identification; and a security object for restricting and controlling access to at least certain portions of the mainframe.

5. The multi-desktop computer system of claim 4, wherein the plurality of object-oriented routines include:

a products object for handling requests to the product information database;

a customer object for handling requests and commands to the customer information database; and a quotes object for handling and calculating requests for rate quotes.

6. The multi-desktop computer system of claim 1, wherein the object-oriented routine is a customer object and the discrete database or application program is a customer information repository legacy system.

7. The multi-desktop computer system of claim 6, wherein several of the desktops are configured to display a customer folder that presents customer information stored in the system database.

8. The multi-desktop computer system of claim 7, wherein the customer folder is substantially identical within the several desktops.

9. The multi-desktop computer system of claim 1, wherein the object-oriented routine is a products object and the discrete database or application program is a products information repository legacy system.

10. A multi-desktop computer system for a financial institution, comprising:

a plurality of functional desktops, including a branch desktop and a financial service agent desktop;

a computer mainframe having a plurality of discrete databases and application programs, including a financial transaction system, a customer information database, and a product information database;

a plurality of object-oriented routines, each of said routines being accessible by the functional desktops, for receiving and processing commands and requests from the functional desktops;

an interface server for providing an interface between the object-oriented routines and the discrete database and application programs;

a plurality of mainframe systems and the interface server provides an interface between the platform and each of the mainframe systems; and a transaction monitor server, operatively coupled between the object oriented routines and the plurality of mainframe systems, for logging the transactions requested and performed by the discrete database and application programs.

* * * * *